US008589941B2

(12) United States Patent
Cardona et al.

(10) Patent No.: US 8,589,941 B2
(45) Date of Patent: Nov. 19, 2013

(54) RESOURCE AFFINITY VIA DYNAMIC RECONFIGURATION FOR MULTI-QUEUE NETWORK ADAPTERS

(75) Inventors: Omar Cardona, Cedar Park, TX (US); James B. Cunningham, Austin, TX (US); Matthew R. Ochs, Austin, TX (US); Rakesh Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 12/766,282

(22) Filed: Apr. 23, 2010

(65) Prior Publication Data

US 2011/0265095 A1 Oct. 27, 2011

(51) Int. Cl.
*G06F 9/50* (2006.01)

(52) U.S. Cl.
USPC .......................................... 718/105; 719/321

(58) Field of Classification Search
None
See application file for complete search history.

(56) References Cited

U.S. PATENT DOCUMENTS

| | | | |
|---|---|---|---|
| 7,307,998 | B1 | 12/2007 | Wang et al. |
| 7,448,044 | B1 | 11/2008 | Rust et al. |
| 7,548,513 | B2 | 6/2009 | Tran |
| 2003/0076849 | A1 | 4/2003 | Morgan et al. |
| 2004/0193811 | A1 | 9/2004 | Chadalapaka et al. |
| 2008/0181245 | A1 | 7/2008 | Basso et al. |
| 2009/0161684 | A1 | 6/2009 | Voruganti et al. |
| 2010/0290467 | A1 | 11/2010 | Eisenhauer et al. |
| 2011/0142064 | A1* | 6/2011 | Dubal et al. ................ 370/412 |
| 2011/0153935 | A1* | 6/2011 | Li ................................ 711/118 |

OTHER PUBLICATIONS

International Search Report and Written Opinion dated May 16, 2011 for International Application No. PCT/EP2011/052992, 13 pages.
"Infiniband Architecture Release 1.0, vol. 1, General Specifications", Infiniband Architecture Specification, Oct. 24, 2000, 913 pages.
Koop, Matthew J., "High-Performance Multi-Transport MPI Design for Ultra-Scale Infiniband Clusters", Dissertation, The Ohio State University, http://proquest.umi.com/pqdlink?Ver=1&Exp=03-29-2016&FMT=7&DID=1887456831&RQT=309&attempt=1&cfc=1, 2009, retrieved from the Internet on Mar. 30, 2011, 211 pages.
USPTO U.S. Appl. No. 12/464,567.
USPTO U.S. Appl. No. 13/453,387.
Digiovani, Bruno et al., "PowerVM Virtualization Active Memory Sharing", http://www.redbooks.ibm.com/abstracts/redp4470.html, published Apr. 28, 2009, 92 pages. (Part 1—pp. 1-30).

(Continued)

*Primary Examiner* — H S Sough
*Assistant Examiner* — Umut Onat
(74) *Attorney, Agent, or Firm* — Francis Lammes; Stephen J. Walder, Jr.; Libby Z. Toub

(57) ABSTRACT

A mechanism is provided for providing resource affinity for multi-queue network adapters via dynamic reconfiguration. A device driver allocates an initial queue pair within a memory. The device driver determines whether workload of the data processing system has risen above a predetermined high threshold. Responsive to the workload rising above the predetermined high threshold, the device driver allocates and initializes an additional queue pair in the memory. The device driver programs a receive side scaling (RSS) mechanism in a network adapter to allow for dynamic insertion of an additional processing engine associated with the additional queue pair. The device driver enables transmit tuple hashing to the additional queue pair.

12 Claims, 5 Drawing Sheets

(56) References Cited

OTHER PUBLICATIONS

Digiovani, Bruno et al., "PowerVM Virtualization Active Memory Sharing", http://www.redbooks.ibm.com/abstracts/redp4470.html, published Apr. 28, 2009, 92 pages. (Part 2—pp. 31-60).

Digiovani, Bruno et al., "PowerVM Virtualization Active Memory Sharing", http://www.redbooks.ibm.com/abstracts/redp4470.html, published Apr. 28, 2009, 92 pages. (Part 3—pp. 61-92).

Eisenhauer, Daniel G. et al., "Discovery and Capability Exchange Management in a Virtualized Computing Platform Utilizing a SR-IOV Adapter", U.S. Appl. No. 12/464,567, filed May 12, 2009, 33 pages.

"Infiniband Architecture Release 1.0, vol. 1, General Specifications", Infiniband Architecture Specification, Oct. 24, 2000, 880 pages.

Office Action from Germany Patent Office dated Dec. 19, 2012, Application No. 11 2011 100 392.7, English translation not available, 12 pages.

* cited by examiner

RESOURCE AFFINITY VIA DYNAMIC RECONFIGURATION FOR MULTI-QUEUE NETWORK ADAPTERS

BACKGROUND

The present application relates generally to an improved data processing apparatus and method and more specifically to mechanisms for providing resource affinity for multi-queue network adapters via dynamic reconfiguration.

As Ethernet media speeds continue to increase, there is a greater need to use more system resources to achieve theoretical maximum performance at a lowest possible latency. System resources, in terms of Ethernet adapter requirements, involve a large physical memory footprint and corresponding direct memory access input/output memory mapping resources due to the need for a large number of transmit/receive descriptors and buffers. A 10 Gbps Ethernet driver typically consumes approximately 150 to 300 MB of physical system memory and direct memory access input/output memory per adapter.

Under traditional driver models, a device driver allocates transmit/receive resources to an amount that would permit the adapter to achieve its theoretical maximum performance. However, if the workload or network traffic is such that the maximum performance limits are not required, then the driver is consuming more resources than needed, which is a waste of system resources. Furthermore, this model does not have the capability to efficiently handle varying workloads.

SUMMARY

In one illustrative embodiment, a method, in a data processing system, is provided for providing resource affinity for multi-queue network adapters via dynamic reconfiguration. The illustrative embodiment allocates an initial queue pair within a memory. The illustrative embodiment determines whether workload of the data processing system has risen above a predetermined high threshold. The illustrative embodiment allocates and initializes an additional queue pair in the memory in response to the workload rising above the predetermined high threshold. The illustrative embodiment programs a receive side sealing (RSS) mechanism in a network adapter to allow for dynamic insertion of an additional processing engine associated with the additional queue pair. The illustrative embodiment enables transmit tuple hashing to the additional queue pair.

In another illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism that provides resource affinity for active memory sharing (AMS) and central processing unit (CPU) utilization via dynamic reconfiguration of the underlying hardware to meet the needs of varying workloads with no interruption in performance or service. Modern adapters may provide multiple packet queue pairs (QPs) for maximum performance. These adapters may be able to perform parallel network data processing via the use of multiple transmit/receive queues (QPs) per interface, which is an essential feature for high transaction workloads and achieving higher line speeds with small packet sizes. The ingress or receive traffic may be tuple hashed by the adapter to the appropriate QP and associated interrupt for operating system processing. The egress or transmit traffic may be tuple hashed by the operating system (OS) driver for delivery to the adapter. Adapters and OS drivers typically allocate multiple QPs with sufficient descriptors and buffers to achieve maximum performance, normally two to four QPs for an average memory footprint of approximately 250 MB per adapter. Each QP may have an associated receive interrupt, thus if multiple QPs are in use and the traffic is low, there is an additional CPU utilization overhead due to increased interrupt dispatch, which could easily be handled by a single QP. This problem is increasingly of interest to performance teams, as analysis of known adapters show that multiple QPs have a negative affect on performance for most normal use cases but are essential in achieving the theoretical maximum performance for certain high-stress and high-transaction workloads.

Figure 1:
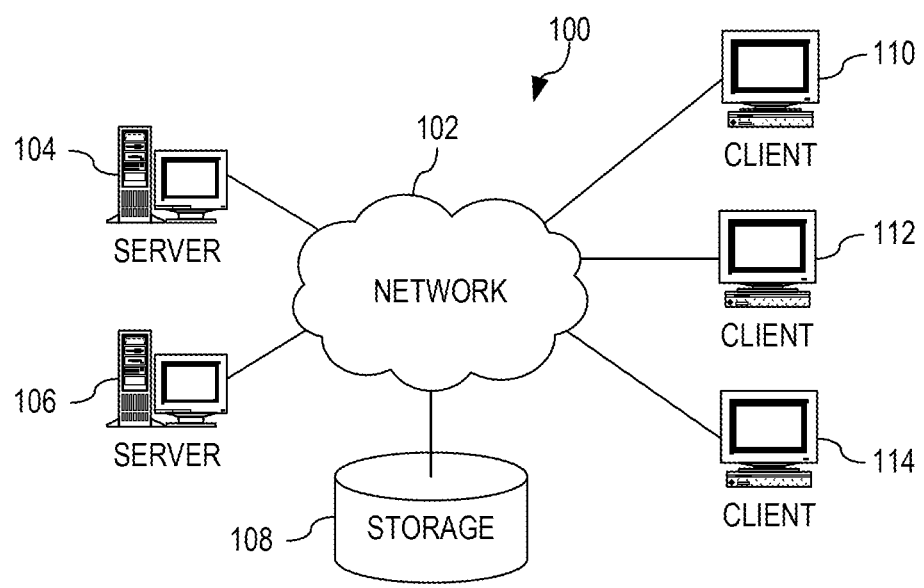
FIG. 1 depicts a pictorial representation of an example distributed data processing system in which aspects of the illustrative embodiments may be implemented.
Figure 2:
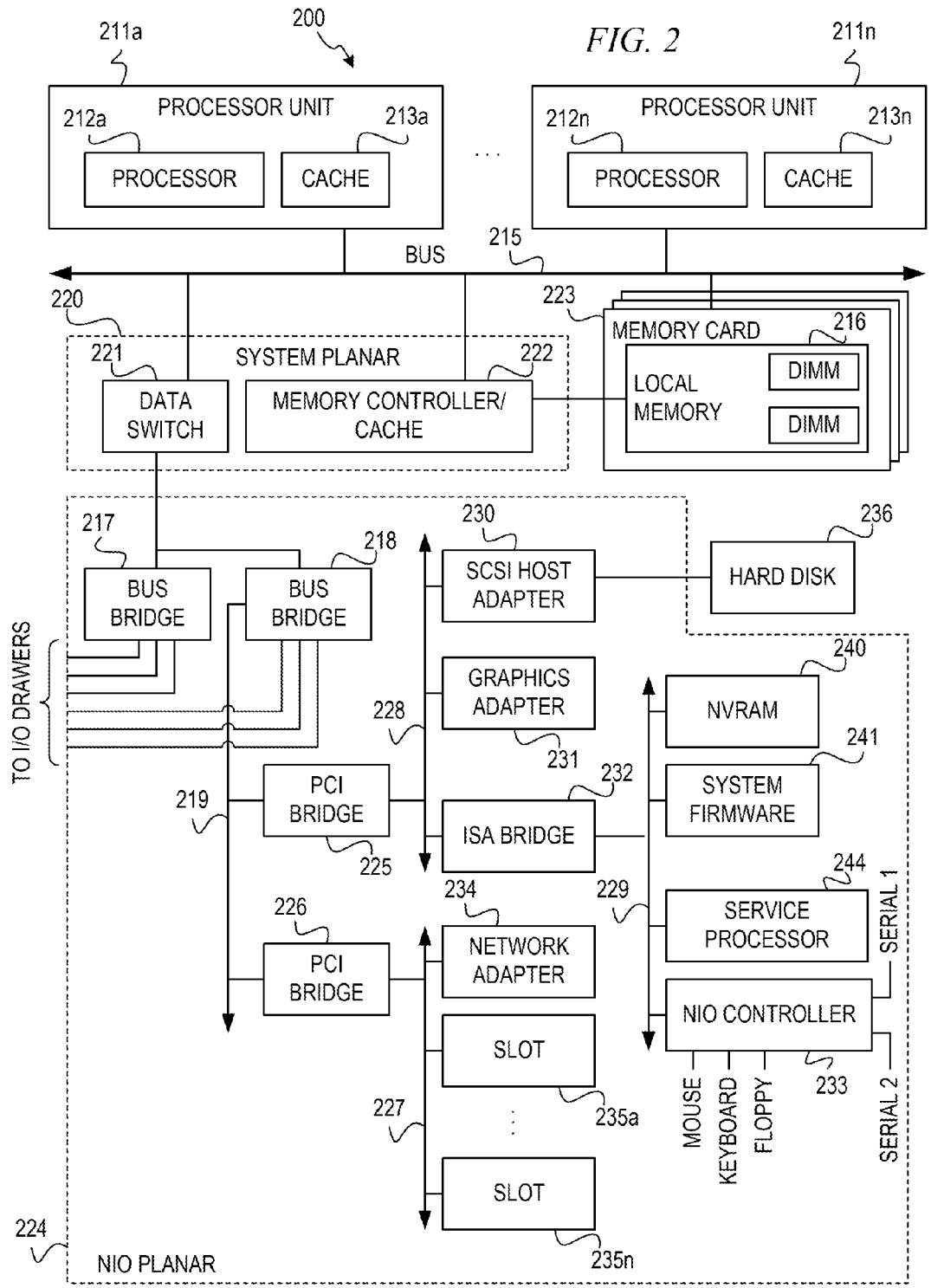
FIG. 2 depicts a block diagram of a data processing system with which aspects of the illustrative embodiments may advantageously be utilized.
Figure 3:
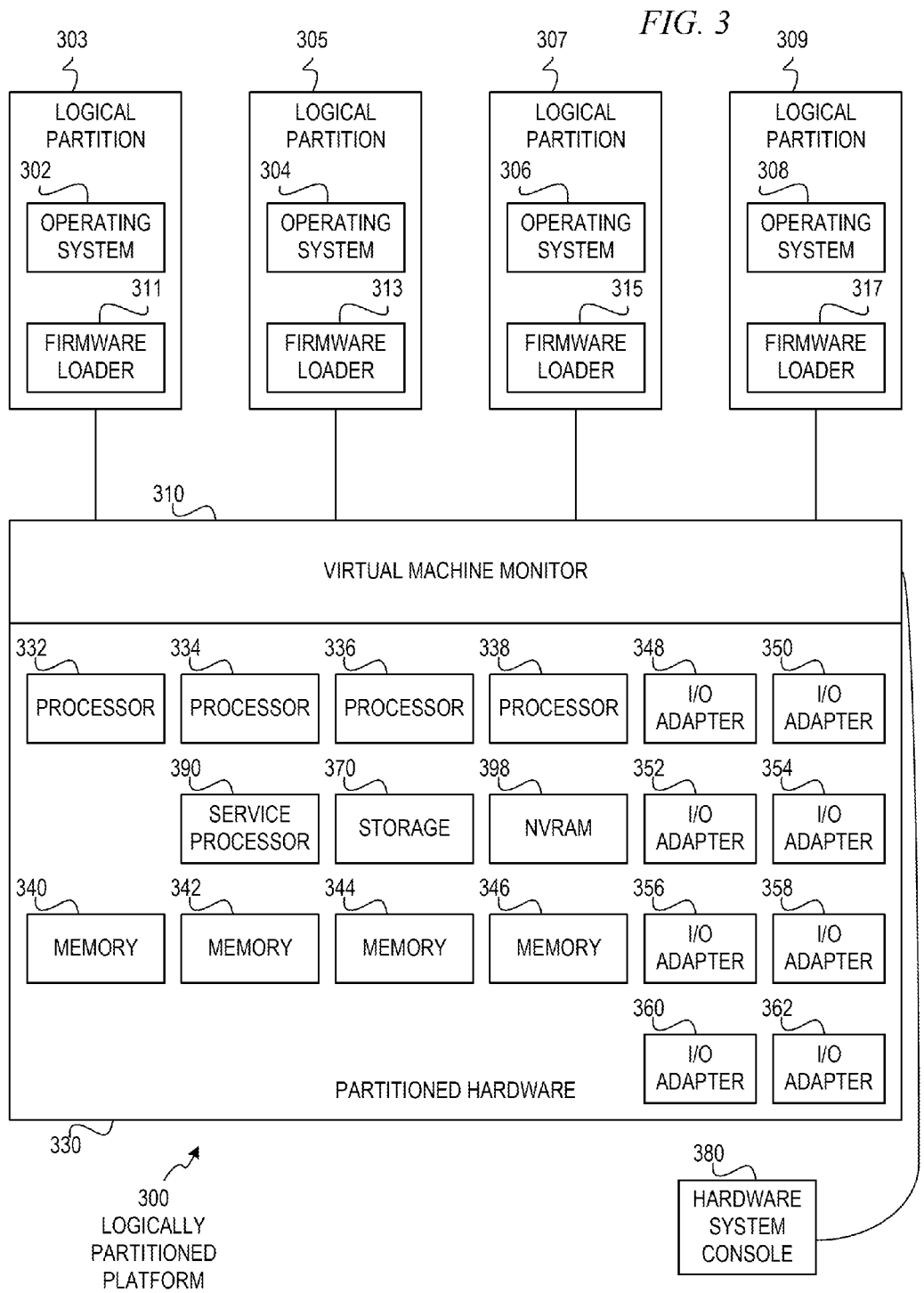
FIG. 3 depicts a block diagram of an exemplary logically partitioned platform in which the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as example environments in which aspects of the illustrative embodiments may be implemented. While the description following FIGS. 1-3 will focus primarily on a single data processing device implementation of a mechanism that provides resource affinity for multi-queue network adapters via dynamic reconfiguration, this is only an example and is not intended to state or imply any limitation with regard to the features of the present invention. To the contrary, the illustrative embodiments are intended to include distributed data processing environments and embodiments in which resource affinity may be provided for multi-queue network adapters via dynamic reconfiguration.

With reference now to the figures and in particular with reference to FIGS. 1-3, example diagrams of data processing environments are provided in which illustrative embodiments of the present invention may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In the illustrative embodiments, a computer architecture is implemented as a combination of hardware and software. The software part of the computer architecture may be referred to as microcode or millicode. The combination of hardware and software creates an instruction set and system architecture that the rest of the computer's software operates on, such as Basic Input/Output System (BIOS), Virtual Machine Monitors (VMM), Hypervisors, applications, etc. The computer architecture created by the initial combination is immutable to the computer software (BIOS, etc), except through defined interfaces which may be few.

Referring now to FIG. 2, there is depicted a block diagram of a data processing system with which aspects of the illustrative embodiments may advantageously be utilized. As shown, data processing system 200 includes processor units 211a-211n. Each of processor units 211a-211n includes a processor and a cache memory. For example, processor unit 211a contains processor 212a and cache memory 213a, and processor unit 211n contains processor 212n and cache memory 213n.

Processor units 211a-211n are connected to main bus 215. Main bus 215 supports system planar 220 that contains processor units 211a-211n and memory cards 223. System planar 220 also contains data switch 221 and memory controller/cache 222. Memory controller/cache 222 supports memory cards 223 that include local memory 216 having multiple dual in-line memory modules (DIMMs).

Data switch 221 connects to bus bridge 217 and bus bridge 218 located within native I/O (NIO) planar 224. As shown, bus bridge 218 connects to peripheral components interconnect (PCI) bridges 225 and 226 via system bus 219. PCI bridge 225 connects to a variety of I/O devices via PCI bus 228. As shown, hard disk 236 may be connected to PCI bus 228 via small computer system interface (SCSI) host adapter 230. Graphics adapter 231 may be directly or indirectly connected to PCI bus 228. PCI bridge 226 provides connections for external data streams through network adapter 234 and adapter card slots 235a-235n via PCI bus 227.

Industry standard architecture (ISA) bus 229 connects to PCI bus 228 via ISA bridge 232. ISA bridge 232 provides interconnection capabilities through NO controller 233 having serial connections Serial 1 and Serial 2. A floppy drive connection, keyboard connection, and mouse connection are provided by NIO controller 233 to allow data processing system 200 to accept data input from a user via a corresponding input device. In addition, non-volatile RAM (NVRAM) 240, connected to ISA bus 229, provides a non-volatile memory for preserving certain types of data from system disruptions or system failures, such as power supply problems. System firmware 241 is also connected to ISA bus 229 for implementing the initial Basic Input/Output System (BIOS) functions. Service processor 244 connects to ISA bus 229 to provide functionality for system diagnostics or system servicing.

The operating system (OS) is stored on hard disk 236, which may also provide storage for additional application software for execution by a data processing system. NVRAM 240 is used to store system variables and error information for field replaceable unit (FRU) isolation. During system startup, the bootstrap program loads the operating system and initiates execution of the operating system. To load the operating system, the bootstrap program first locates an operating system kernel image on hard disk 236, loads the OS kernel image into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 200 may be, for example, a stand-alone system or part of a network such as a local-area network (LAN) or a wide-area network (WAN). As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

With reference now to FIG. 3, a block diagram of an exemplary logically partitioned platform is depicted in which the illustrative embodiments may be implemented. The hardware in logically partitioned platform 300 may be implemented, for example, using the hardware of data processing system 200 in FIG. 2.

Logically partitioned platform 300 includes partitioned hardware 330, operating systems 302, 304, 306, 308, and virtual machine monitor 310. Operating systems 302, 304, 306, and 308 may be multiple copies of a single operating system or multiple heterogeneous operating systems simultaneously run on logically partitioned platform 300. These operating systems may be implemented, for example, using z/OS, which is designed to interface with a virtualization mechanism, such as partition management firmware, e.g., a hypervisor, z/OS is used only as an example in these illustrative embodiments. Of course, other types of operating systems, such as OS/400, AIX®, and Linux®, may be used depending on the particular implementation. Operating systems 302, 304, 306, and 308 are located in logical partitions 303, 305, 307, and 309, respectively.

Hypervisor software is an example of software that may be used to implement platform (in this example, virtual machine monitor 310) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logically partitioned platform 300 may also make use of IBM®'s PowerVM™ Active Memory™ Sharing, which is an IBM® PowerVM™ advanced memory virtualization technology that provides system memory virtualization capabilities to IBM Power Systems®, allowing multiple logical partitions to share a common pool of physical memory. The physical memory of IBM Power Systems® may be assigned to multiple logical partitions either in a dedicated or shared mode. A system administrator has die capability to assign sortie physical memory to a logical partition and some physical memory to a pool that is shared by other logical partitions. A single partition may have either dedicated or shared memory. Active Memory™ Sharing may be exploited to increase memory utilization on the system either by decreasing the system memory requirement or by allowing the creation of additional logical partitions on an existing system.

Logical partitions 303, 305, 307, and 309 also include partition firmware loader 311, 313, 315, and 317. Partition firmware loader 311, 313, 315, and 317 may be implemented using IPL or initial boot strap code, IEEE-1275 Standard Open Firmware, and runtime abstraction software (RTAS), which is available from International Business Machines Corporation.

When logical partitions 303, 305, 307, and 309 are instantiated, a copy of the boot strap code is loaded into logical partitions 303, 305, 307, and 309 by virtual machine monitor 310. Thereafter, control is transferred to the boot strap code with the boot strap code then loading the open firmware and RTAS. The processors associated or assigned to logical partitions 303, 305, 307, and 309 are then dispatched to the logical partition's memory to execute the logical partition firmware.

Partitioned hardware 330 includes a plurality of processors 332-338, a plurality of system memory units 340-346, a plurality of input/output (I/O) adapters 348-362, and storage unit 370. Each of the processors 332-338, memory units 340-346, NVRAM storage 398, and I/O adapters 348-362 may be assigned to one of multiple logical partitions 303, 305, 307, and 309 within logically partitioned platform 300, each of which corresponds to one of operating systems 302, 304, 306, and 308.

Virtual machine monitor 310 performs a number of functions and services for logical partitions 303, 305, 307, and 309 to generate and enforce the partitioning of logical partitioned platform 300. Virtual machine monitor 310 is a firmware implemented virtual machine identical to the underlying hardware. Thus, virtual machine monitor 310 allows the simultaneous execution of independent OS images 302, 304, 306, and 308 by virtualizing all the hardware resources of logical partitioned platform 300.

Service processor 390 may be used to provide various services, such as processing of platform errors in logical partitions 303, 305, 307, and 309. Service processor 390 may also act as a service agent to report errors back to a vendor, such as International Business Machines Corporation. Operations of the different logical partitions may be controlled through a hardware system console 380. Hardware system console 380 is a separate data processing system from which a system administrator may perform various functions including reallocation of resources to different logical partitions.

The illustrative embodiments provide for an operating system (OS) driver to initially allocate only a single queue pair (QP), i.e. a transmit/receive pair, with slightly above the minimum required resources to achieve normal operation. As the traffic flow or workload increases beyond predetermined thresholds, the OS driver dynamically allocates additional QPs as needed. As the QPs are added to the running OS driver and made available to an adapter, the traffic is hashed in both ingress or receive and egress or transmit paths to more central processing units (CPUs), effectively scaling in performance and CPU/memory resource usage. Since the performance scaling is achieved via additional QPs rather than a static descriptor count, system resources may be reduced when no longer needed. As the traffic flow and workload drops below an established minimum threshold, the OS driver may remove QPs and drop back down to minimal resource utilization for normal operation. This cycle repeats itself when the workload or traffic increases. Hence, the illustrative embodiments effectively achieve dynamic reconfiguration to tune for performance, while providing CPU utilization and active memory sharing affinity.

Figure 4:
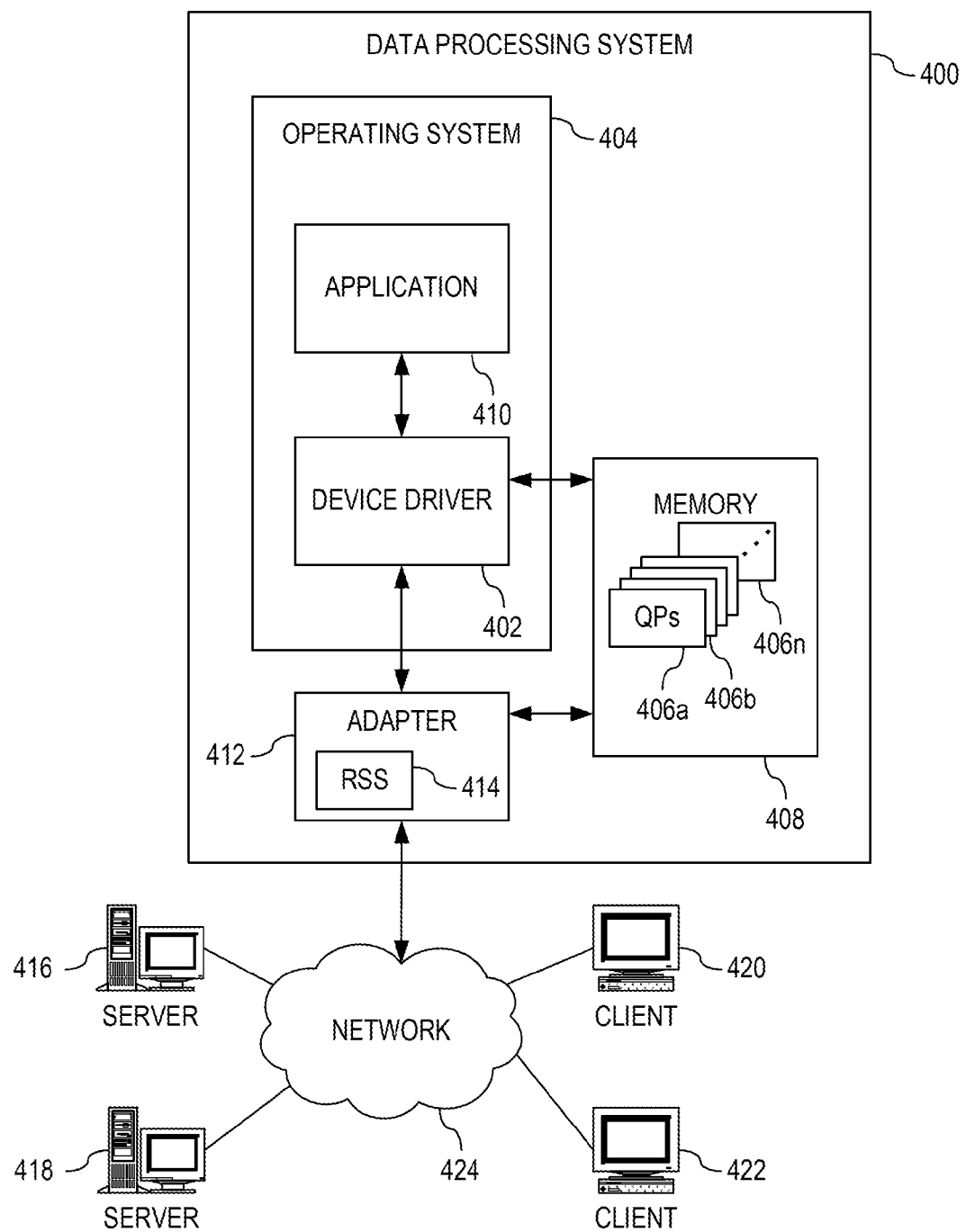
FIG. 4 depicts an exemplary implementation of a mechanism that provides resource affinity for multi-queue network adapters via dynamic reconfiguration in accordance with an illustrative embodiment.

FIG. 4 is an example block diagram illustrating the main operational components and their interactions in accordance with one illustrative embodiment. The elements shown in FIG. 4 may be implemented in hardware, software, or any combination of hardware and software. In one illustrative embodiment, the elements of FIG. 4 are implemented as software executing on one or more processors of one or more data processing devices or systems.

FIG. 4 depicts an exemplary implementation of a mechanism that provides resource affinity for multi-queue network adapters via dynamic reconfiguration in accordance with an illustrative embodiment. Data processing system 400 comprises device driver 402 within operating system 404. Device driver 402 provides one or more queue pairs 406a-406n in memory 408 for use by application 410 and network adapter 411. While the illustrative embodiment only illustrates one device driver 402, one application 410, and one network adapter 412, one of ordinary skill in the art may recognize that data processing system 400 may comprise a plurality of device drivers, a plurality of applications, and a plurality of network adapters within data processing system 400.

When operating system 404 initializes, operating system 404 configures and initializes device driver 402. Devices driver 402 then allocates an initial queue pair 406a, which may comprise a number of receive descriptors/buffers and a number of transmit descriptors/buffers, within memory 408. Device driver 402 then starts network adapter 412 so that traffic may be transmitted to network adapter 412. During operation, when only queue pair 406a is initialized, device driver 402 receives traffic that is to be transmitted to network adapter 412 and sends the traffic onto network adapter 412 for delivery. Network adapter 412 then sends the transmit traffic onto a device, such as server 416, server 418, client 420, client 422, or the like, via network 424. Conversely, when network adapter 412 receives traffic that is to be transmitted to device driver 402 from a device, such as server 416, server 418, client 420, client 422, or the like, via network 424, network adapter 412 raises an interrupt for processing by operating system 404 and the traffic is sent to device driver 402. Each of queue pairs 406a and 406b-406n, which may be further allocated as described below, have its own associated receive interrupt.

After device driver 402 allocates and instantiates queue pair 406a, device driver 402 continuously monitors a workload of operating system 404 through data flow and resource availability. Device driver 402 may monitor parameters such as transmit/receive bytes per second, a number of flow control frames being sent and received by network adapter 412, a number of DMA overruns detected by network adapter 412, a number of transmit timeout events detected by device driver 402, a number of receive packets processed by device driver 402 per interrupt, a number of transmit packets on a software queue, or the like. When device driver 402 detects an insufficient resource condition through the workload monitoring, such as through a predetermined high threshold being exceeded, device driver 402 may dynamically allocate and initialize an additional one of queue pairs 406b-406n. Device driver 402 then programs receive side scaling (RSS) mechanism 414 within network adapter 412 to allow for dynamic insertion of an additional processing engine associated with queue pair 406a and the additional one of queue pairs 406b-406n. Device driver 402 then enables transmit tuple hashing to queue pair 406a and the additional one of queue pairs 406b-406n. Receive tuple hashing and processing by network adapter 412 automatically enables through the programming of RSS mechanism 414. Device driver 402 continues to add ones of queue pairs 406b-406n, if not already allocated and initialized, as workload requires, until all available ones of queue pairs 406b-406n are consumed or until queue pairs 406a-406n exceed a number of central processing units in data processing system 400. Device Driver 402 also reprograms RSS mechanism 414 in network adapter 412 to allow for dynamic insertion of an additional processing engine each time a new one of queue pairs 406b-406n is added, as well as enables transmit tuple hashing to the new one of queue pairs 406b-406n.

When device driver 402 recognizes a decrease in workload, such as through the workload falling below a predetermined low threshold, device driver 402 may dynamically reprogram RSS mechanism 414 in network adapter 412 to allow for deletion of an allocated one of queue pairs 406a-406n. Device driver 402 then disables transmit tuple hashing to the deleted one of queue pairs 406a-406n. Once the deleted one of queue pairs 406a-406n quiesces, device driver 402 removes the deleted one of queue pairs 406a-406n thereby freeing up the memory used by the deleted one of queue pairs 406a-406n. As with the enable of receive tuple hashing in network adapter 412, receive tuple hashing and processing by network adapter 412 automatically disables through the reprogramming of RSS mechanism 414.

Thus, the illustrative embodiments provide a mechanism that provides resource affinity for active memory sharing (AMS) and central processing unit (CPU) utilization via dynamic reconfiguration of the underlying hardware to meet the needs of varying workloads with no interruption in performance or service. As traffic flow or workload increases beyond predetermined thresholds, the device driver dynamically allocates additional queue pairs as needed. As the traffic flow and workload drops below a predetermined minimum threshold, the device driver may remove queue pairs and drop back down to minimal resource utilization for normal operation. This cycle repeats itself when the workload or traffic increases and decreases.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
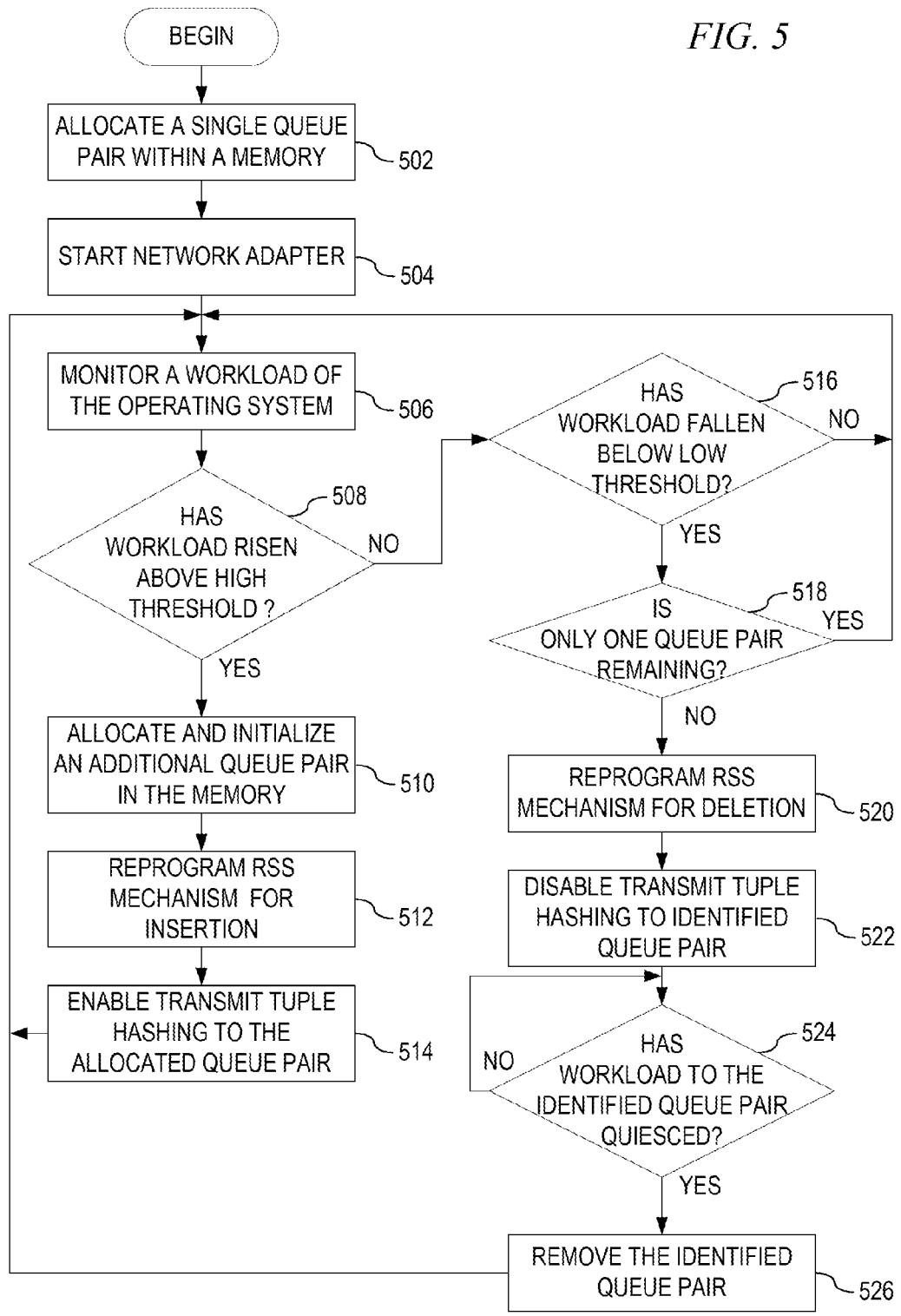
FIG. 5 provides a flowchart outlining example operations of providing resource affinity for multi-queue network adapters via dynamic reconfiguration in accordance with an illustrative embodiment.

Referring now to FIG. 5, this figure provides a flowchart outlining example operations of providing resource affinity for multi-queue network adapters via dynamic reconfiguration in accordance with an illustrative embodiment. As the operation begins, a configured and initialized device driver allocates an initial queue pair within a memory (step 502). The device driver then starts the network adapter so that traffic may be transmitted to the network adapter (step 504).

After the device driver allocates and instantiates the queue pair, the device driver continuously monitors a workload of the operating system through data flow and resource availability (step 506). The device driver may monitor parameters such as transmit/receive bytes per second, a number of flow control frames being sent and received by the network adapter, a number of DMA overruns detected by the network adapter, a number of transmit timeout events detected by the device driver, a number of receive packets processed by the device driver per interrupt, a number of transmit packets on a software queue, or the like. The device driver then determines whether a predetermined high threshold has been exceeded that indicates an insufficient resource condition through the workload monitoring (step 508). If at step 508 the workload has risen above the predetermined high threshold, then the device driver dynamically allocates and initializes an additional queue pair in the memory (step 510). The device driver then programs/reprograms the RSS mechanism in the network adapter to allow for dynamic insertion of an additional processing engine (step 512) and the device driver enables transmit tuple hashing to the newly allocated queue pair (step 514), with the operation returning to step 506 thereafter.

If at step 508 the workload fails to have risen above the predetermined high threshold, the device driver determines whether the workload has fallen below a predetermined low threshold (step 516). If at step 516 the device driver determines that the workload has not fallen below the predetermined low threshold, then the operation returns to step 506. If at step 516 the device driver determines that the workload has fallen below the predetermined low threshold, then the device driver determines if there is only one queue pair remaining to be allocated (step 518). If at step 518 the device driver determines that there is only one queue pair remaining, then the operation returns to step 506. If at step 518 the device driver determines that there are more than one queue pair remaining, then the device driver may dynamically reprogram the RSS mechanism in the network adapter to allow for deletion of an allocated queue pair (step 520). The device driver then disables transmit tuple hashing to an identified queue pair (step 522). The device driver then determines whether workload to the identified queue pair has quiesced (step 524). If at step 524 the device driver determines that the workload to the identified queue pair fails to have quiesced, then the operation returns to step 524. IF at step 524 the device driver determines that the workload to the identified queue pair has quiesced, the device driver removes the identified queue pair from memory (step 526) thereby freeing up the memory used by the identified queue pair. The operation then returns to step 506.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for providing resource affinity for active memory sharing (AMS) and central processing unit (CPU) utilization via dynamic reconfiguration of the underlying hardware to meet the needs of varying workloads with no interruption in performance or service. As traffic flow or workload increases beyond predetermined thresholds, the device driver dynamically allocates additional queue pairs as needed. As the traffic flow and workload drops below a predetermined minimum threshold, the device driver may remove queue pairs and drop back down to minimal resource utilization for normal operation. This cycle repeats itself when the workload or traffic increases and decreases.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:
    allocate an initial queue pair within a memory, wherein each queue pair is a transmit/receive queue pair;
    determine whether workload of the computing device has risen above a predetermined high threshold;
    responsive to the workload rising above the predetermined high threshold:
        allocate and initialize an additional queue pair in the memory;
        program a receive side scaling (RSS) mechanism in a network adapter to allow for dynamic insertion of an additional processing engine associated with the additional queue pair; and
        enable transmit tuple hashing to the additional queue pair; wherein the computer readable program further causes the computing device to:
    determine whether the workload has fallen below a predetermined low threshold;
    responsive to the workload falling below the predetermined low threshold, determine whether there is only one queue pair remaining allocated in the memory; and
    responsive to more than one queue pair remaining allocated in the memory:
        reprogram the RSS mechanism in the network adapter to allow for deletion of an allocated queue pair;
        disable transmit tuple hashing to an identified queue pair;
        determine whether the workload to the identified queue pair has quiesced; and
        responsive to the workload to the identified queue pair quiescing, remove the identified queue pair from memory, thereby freeing up memory used by the identified queue pair.

2. The computer program product of claim 1, wherein the computer readable program further causes the computing device to:
    repeat the computer readable program to allocate and initialize, program, and enable each time the workload of the computing device rises above the predetermined high threshold.

3. The computer program product of claim 1, wherein the computer readable program to program the receive side scaling (RSS) mechanism in the network adapter to allow for dynamic insertion of the additional processing engine associated with the additional queue pair further causes the computing device to:
    enable transmit tuple hashing to the initial queue pair.

4. The computer program product of claim 1, wherein the computer readable program to determine whether the workload of the computing device has risen above the predetermined high threshold is performed by the computer readable program that further causes the computing device to monitor the workload of the computing device through data flow and resource availability.

5. The computer program product of claim 4, wherein the computer readable program further causes the computing device to monitor at least one parameter associated with the workload and wherein the at least one parameter is at least one of transmit/receive bytes per second, a number of flow control frames being sent and received by the network adapter, a number of direct memory access (DMA) overruns detected by the network adapter, a number of transmit timeout events detected by a device driver, a number of receive packets processed by the device driver per interrupt, or a number of transmit packets on a software queue.

6. The computer program product of claim 1, wherein the computer readable program further causes the computing device to:
    responsive to the workload to the identified queue pair failing to quiesce, wait for the workload to the identified queue pair to quiesce before removing the identified queue pair from memory, thereby freeing up memory used by the identified queue pair.

7. An apparatus, comprising:
    a processor; and
    a memory coupled to the processor, wherein the memory comprises instructions which, when executed by the processor, cause the processor to:
    allocate an initial queue pair within a memory, wherein each queue pair is a transmit/receive queue pair;

determine whether workload of the apparatus has risen above a predetermined high threshold;

responsive to the workload rising above the predetermined high threshold:

allocate and initialize an additional queue pair in the memory;

program a receive side scaling (RSS) mechanism in a network adapter to allow for dynamic insertion of an additional processing engine associated with the additional queue pair; and enable transmit tuple hashing to the additional queue pair; wherein the instructions further cause the processor to:

determine whether the workload has fallen below a predetermined low threshold;

responsive to the workload falling below the predetermined low threshold, determine whether there is only one queue pair remaining allocated in the memory; and responsive to more than one queue pair remaining allocated in the memory:

reprogram the RSS mechanism in the network adapter to allow for deletion of an allocated queue pair;

disable transmit tuple hashing to an identified queue pair;

determine whether the workload to the identified queue pair has quiesced; and responsive to the workload to the identified queue pair quiescing, remove the identified queue pair from memory, thereby freeing up memory used by the identified queue pair.

8. The apparatus of claim 7, wherein the instructions further cause the processor to:

repeat the computer readable program to allocate and initialize, program, and enable each time the workload of the apparatus rises above the predetermined high threshold.

9. The apparatus of claim 7, wherein the instructions to program the receive side scaling (RSS) mechanism in the network adapter to allow for dynamic insertion of the additional processing engine associated with the additional queue pair further cause the processor to:

enable transmit tuple hashing to the initial queue pair.

10. The apparatus of claim 7, wherein the instructions to determine whether the workload of the apparatus has risen above the predetermined high threshold is performed by the instructions that further cause the processor to monitor the workload of the apparatus through data flow and resource availability.

11. The apparatus of claim 10, wherein the instructions further causes the processor to monitor at least one parameter associated with the workload and wherein the at least one parameter is at least one of transmit/receive bytes per second, a number of flow control frames being sent and received by the network adapter, a number of direct memory access (DMA) overruns detected by the network adapter, a number of transmit timeout events detected by a device driver, a number of receive packets processed by the device driver per interrupt, or a number of transmit packets on a software queue.

12. The apparatus of claim 7, wherein the instructions further cause the processor to:

responsive to the workload to the identified queue pair failing to quiesce, wait for the workload to the identified queue pair to quiesce before removing the identified queue pair from memory, thereby freeing up memory used by the identified queue pair.

\* \* \* \* \*